United States Patent
Fu et al.

(10) Patent No.: US 11,200,150 B2
(45) Date of Patent: Dec. 14, 2021

(54) MULTI-TENANTED BUILD SYSTEM WITH VISUALIZATION OF DYNAMIC BUILD PROGRESS

(71) Applicant: EMC IP Holding Company LLC, Hopkinton, MA (US)

(72) Inventors: Weijia Fu, Chengdu (CN); Robert J. Bell, IV, Mont Vernon, NH (US); Robert A. Ballantyne, Mansfield, MA (US); Jun Zhao, Wangcang (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/740,642

(22) Filed: Jan. 13, 2020

(65) Prior Publication Data

US 2021/0216440 A1    Jul. 15, 2021

(51) Int. Cl.
*G06F 9/44* (2018.01)
*G06F 9/455* (2018.01)
*G06F 11/36* (2006.01)

(52) U.S. Cl.
CPC ...... *G06F 11/3664* (2013.01); *G06F 11/3624* (2013.01)

(58) Field of Classification Search
CPC .......................... G06F 11/3664; G06F 11/3624
See application file for complete search history.

(56) References Cited

U.S. PATENT DOCUMENTS

| | | | |
|---|---|---|---|
| 10,001,975 B2 | 6/2018 | Bharthulwar | |
| 10,216,512 B1* | 2/2019 | Mathew | G06F 8/41 |
| 10,437,635 B2 | 10/2019 | Layman et al. | |
| 10,756,991 B2 | 8/2020 | Layman et al. | |
| 2001/0056341 A1* | 12/2001 | Pennello | G06F 11/3636 703/22 |
| 2008/0222606 A1* | 9/2008 | Solirov | G06F 11/3672 717/122 |
| 2009/0113396 A1* | 4/2009 | Rosen | G06F 8/71 717/127 |
| 2013/0152047 A1* | 6/2013 | Moorthi | G06F 11/368 717/124 |
| 2014/0282400 A1* | 9/2014 | Moorthi | G06F 8/71 717/122 |

(Continued)

OTHER PUBLICATIONS

Jesse Glick, Building a DSL with Apache Groovy, 2016, pp. 1-33. http://events17.linuxfoundation.org/sites/events/files/slides/Building%20an%20extensible%20DSL%20in%20Apache%20Groovy.pdf (Year: 2016).*

(Continued)

*Primary Examiner* — Mongbao Nguyen
(74) *Attorney, Agent, or Firm* — BainwoodHuang

(57) ABSTRACT

A method of operating a build system includes, in a build engine, concurrently executing a plurality of build processes for corresponding heterogeneous builds, the build processes generating respective streams of build progress information in a build engine output. A build monitor process is executed which is configured and operative at regular intervals to (1) collect current-interval build progress information from the build engine output, and (2) use the current-interval build progress information to refresh a build-organized summary on a user interface device, the build-organized summary having distinct display sections summarizing build process history for the respective build processes.

20 Claims, 3 Drawing Sheets

(56) References Cited

U.S. PATENT DOCUMENTS

| | | | | |
|---|---|---|---|---|
| 2014/0282450 A1* | 9/2014 | Jubran | .................... | G06F 8/443 |
| | | | | 717/151 |
| 2017/0083386 A1* | 3/2017 | Wing | ..................... | G06Q 10/10 |
| 2019/0129712 A1* | 5/2019 | Hawrylo | ................... | G06F 8/71 |
| 2019/0243753 A1* | 8/2019 | Zhang | ................ | G06F 11/3664 |
| 2019/0294535 A1* | 9/2019 | Allen | ................. | G06F 11/3664 |
| 2020/0409831 A1* | 12/2020 | Balasubramanian | ........................ | |
| | | | | G06F 11/3692 |

OTHER PUBLICATIONS

Eiman Aldhahri, Visualization Techniques for Effective Software Comprehend, 2016, pp. 1355-1358. https://ieeexplore.ieee.org/stamp/stamp.jsp?tp=&arnumber=7881546 (Year: 2016).*

* cited by examiner

MULTI-TENANTED BUILD SYSTEM WITH VISUALIZATION OF DYNAMIC BUILD PROGRESS

BACKGROUND

The present invention relates to the field of application build systems, i.e., specialized computer systems for creating new versions of complex multi-component computer applications.

SUMMARY

A method is disclosed of operating a build system that includes, in a build engine, concurrently executing a plurality of build processes for corresponding heterogeneous builds, the build processes generating respective streams of build progress information in a build engine output. A build monitor process is executed which is configured and operative at regular intervals to (1) collect current-interval build progress information from the build engine output, and (2) use the current-interval build progress information to refresh a build-organized summary on a user interface device, the build-organized summary having distinct display sections summarizing build process history for the respective build processes.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
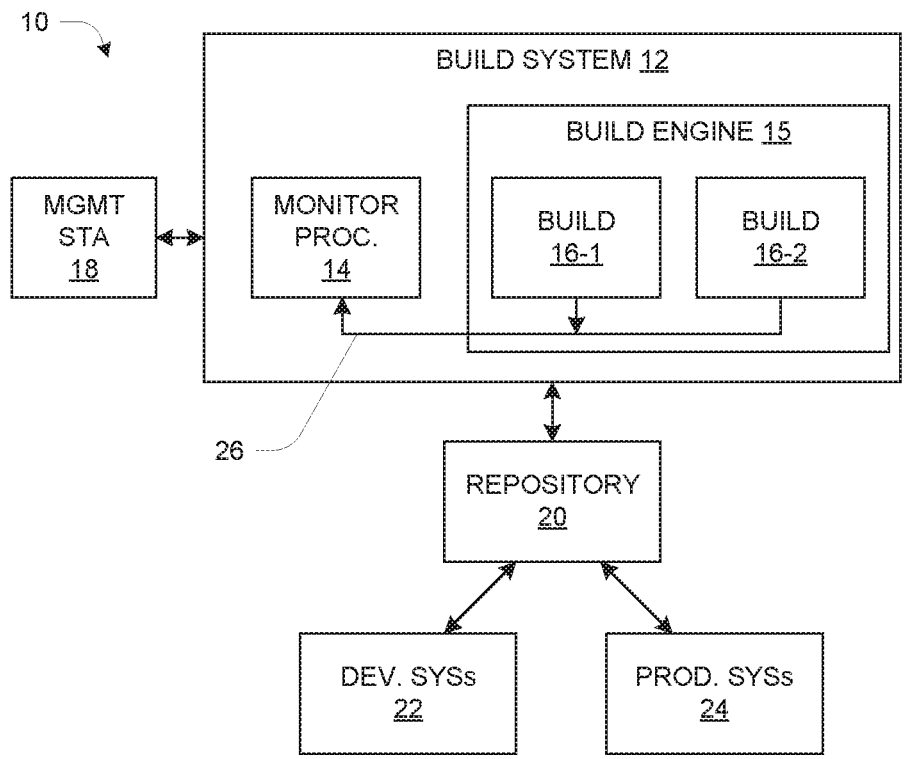
FIG. 1 is a block diagram of a computer system including a multi-tenanted build system.

Overview Performing a full product build which is composed of multiple components can take a long time, e.g., on the order of hours. A management user typically tracks the progress of builds via a management station having a user interface on which build progress information is displayed, where the build progress information is obtained via so-called "console output" of the build processes themselves. Component build status is monitored, for example, to determine:

what component has not started
what exact component is running
what exact component has completed with failure
what exact component was aborted by user or system It is especially challenging to identify component build status from build console output if some stages are running concurrently. This is the case in a so-called multi-tenanted build system in which distinct builds (e.g., "retail" and "debug") are being built concurrently and respective console outputs are interleaved together and thus difficult to analyze.

In addition to component build status, other build information may be useful, and there may be different sources even for a given single build. In one example, a Gradle-driven system is used with Artifactory-hosted remote cache to build under Git repositories. The following information helps consumers and developers:

Every component commit's hash value (e.g., SHA hash)
Every component's build cache key
Every component build duration
Artifacts location
Component build log All this useful information is retrieved from multiple systems, like Gradle (build tool), Artifactory (repository manager), Jenkins (automation server), GitHub (version control & source code management), etc., and it is required to show component build status in real time. Combining these requirements becomes even more challenging.

To solve the above problems and provide an ability to see overall progress of individual builds within a multi-tenanted build system, a technique is disclosed that employs a separate monitor process to dynamically show the build progress and information in a summary table. In general, the technique can provide for visualization of dynamic progress for multi-tenanted build system. In one embodiment, the build system executes in a so-called Jenkins pipeline, and the technique leverages certain features of Jenkins pipeline and domain-specific language (DSL) (e.g., removeSummaries, createSummary commands).

The disclosed technique is in contrast to other known or possible alternatives such as using a standard Jenkins job, which allows a multi-tenanted build system to be invoked, or using a Jenkins pipeline in a standalone manner. Using a standard Jenkins job, all monitoring and status have to be embedded within all of the builds within the multi-tenanted build, and it is not easy to troubleshoot issue between builds. Using a standalone Jenkins pipeline, it is necessary for the management user to either toggle back and forth between individual component builds, or to understand references across components. Yet another alternative is to create a custom web service to retrieve every component build status and other build information regularly, followed by storing the information to a database then displaying data in a web page. Such an approach requires significant effort on web service development and maintenance and still includes some of the same drawbacks, e.g., the need to switch back and forth between the build engine (e.g., Jenkins) and the web service, and difficulty troubleshooting issues between Jenkins, database and web service.

To speed development and simplify maintenance of multi-tenanted builds, a disclosed embodiment uses Jenkins Pipeline domain-specific language (DSL) to execute the various builds as well as collect all build information and status. These functions are performed in a separate monitoring process which can dynamically update an HTML display at fixed intervals, using modern Ajax web technology. To improve usability, the status information is shown using the build page of the corresponding multi-tenanted Jenkins job, further simplifying context switching and troubleshooting of the build.

To provide dynamic status updates from a multi-tenanted build, the technique uses parallel DSL, where the monitoring process runs in a separate process outside of the build(s), allowing refresh of the summary table at fixed intervals. Thus, key aspects of such embodiments includes:

1. Application of modern web technology within a build engine (e.g., Jenkins Pipeline definitions) to provide dynamic updates related to the multi-tenanted build system 2. Use of separate process in parallel with build processes in build engine to collect build information and update component build status.

Embodiments

FIG. 1 is a block diagram of a specialized computer system 10 used in connection with development and/or maintenance of a computer program product or application. Of primary focus in this description is a build system 12 used to create new versions of application images. The build system 12 is shown as including a monitor process 14 and a build engine 15 that executes a plurality of build processes or "builds" 16, which in this simplified example are two builds 16-1, 16-2. The build system 12 interfaces with a management station (MGMT STA) 18, a repository 20, developments systems (DEV SYSs) 22, and productions systems (PROD SYSs) 24. The management station 18 is used to orchestrate operation of the build system 12 under control of a human management user, including certain user-interface functionality as described more herein. The repository 20 is used to store created versions, or "builds" of the application, along with versions of the source components of the application, i.e., routines, functions, sub-programs, library elements, etc., which are provided by the development systems 22 as used by developers, application maintenance personnel, etc. The production systems 24 are used to deploy new builds from the repository 20 to end-users of the application, and include for example distribution functions, notification functions, downloading functions, etc. In the specific context of an application used in a data storage system product, the production systems 24 include interfaces to data storage systems being operated by customers, along with software for automated updating of application images with new builds as generally known in the art.

In the present description the term "build" is used to refer to multiple things, with reliance on context for correct understanding. In a conventional manner it is used as a verb to refer to the act of building a new version or image, typically including compiling, linking, etc. as generally known. It also refers to an instance of a build process 16, e.g., a build 16-1. Finally it also refers to the result of a build process 16, i.e., a new version of the application as created by performing a build process 16.

The build system 12 is described as "multi-tenanted", which refers to the fact that an overall build of the application includes a set of builds for the constituent components, which in general are executed in parallel as much as possible. Additionally, the disclosed technique uses different build processes 16 to create distinct, or heterogeneous, builds of the application. In one example, the build process 16-1 is creating a regular version for release to customers, and is thus referred to as a "retail" build, while the other build process 16-2 creates a specialized build for use by the developers in debugging and refining their code, and is thus referred to as a "debug" build. Those skilled in the art will appreciate that the disclosed technique may be applied more broadly to multi-tenanted build systems supporting other types of heterogeneous builds of one or more applications. Each build process 16 generates a respective stream of build progress information, which are provided to the monitor process 14 is a build engine output 26. Each line or record of progress information is tagged with the name of the component that it relates to, and this information is used to process the information into a build-organized summary table as described herein.

Figure 2:
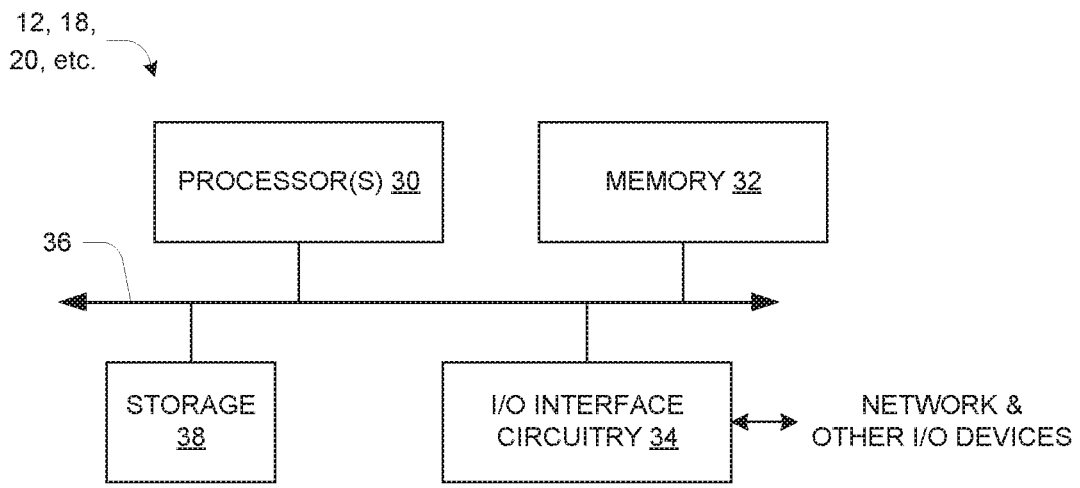
FIG. 2 is a block diagram of a physical computer from a hardware perspective.

FIG. 2 shows certain hardware details of the subsystems of FIG. 1, e.g., build system 12 (including build engine 15), management station 18, repository 20 etc., each being implemented as one or more physical computers executing corresponding application programs or "software". The physical computer hardware includes one or more processors 30, memory 32, and interface circuitry 34 interconnected by data interconnections 36 such as one or more high-speed data buses. The interface circuitry 34 provides hardware connections to external networks/systems and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of a build application, for example, can be referred to as a build circuit or build component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
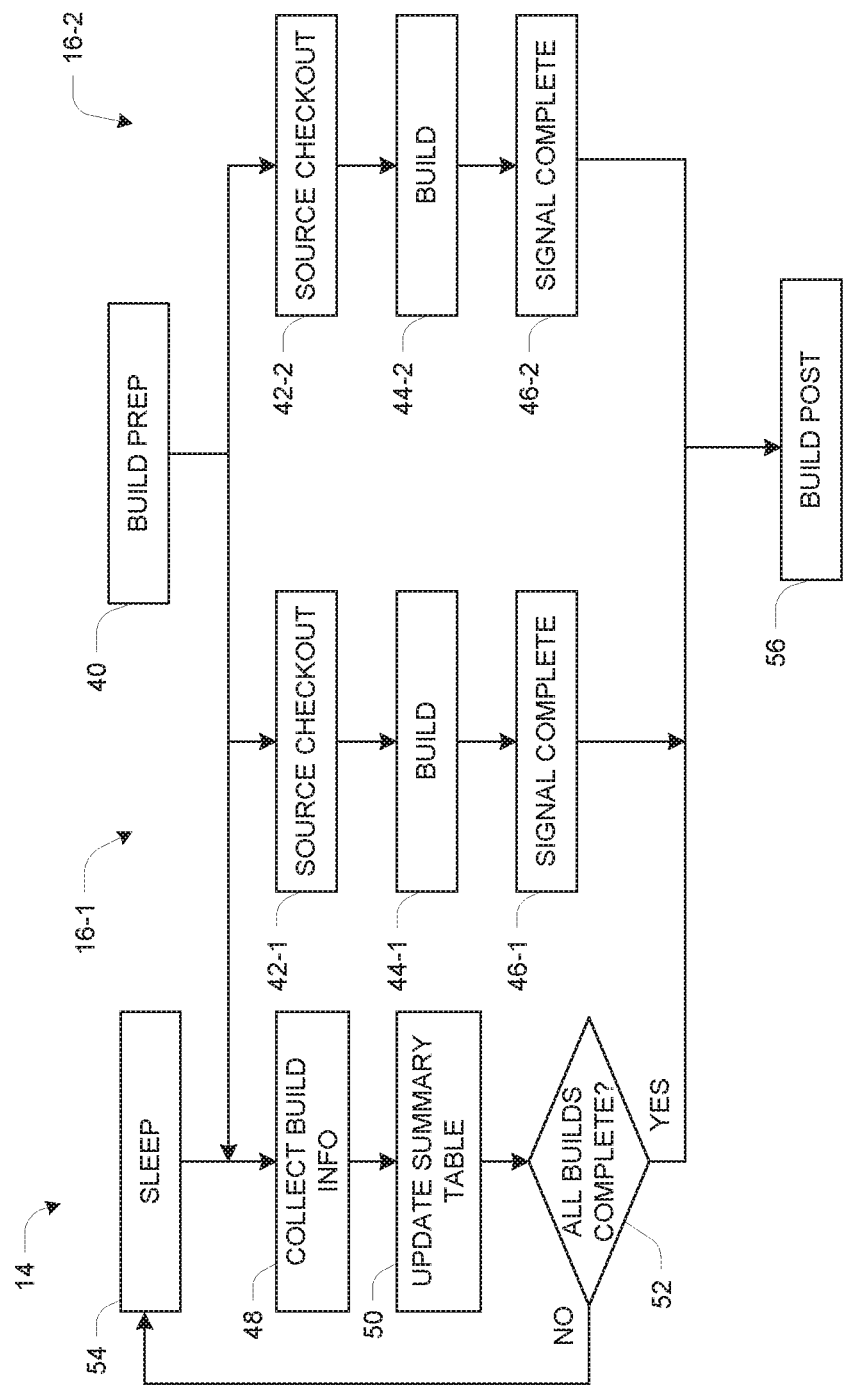
FIG. 3 is a schematic diagram illustrating operation of the build system.

FIG. 3 shows details of operation of the build system 12. As noted above, one key aspect is the use of a particular summary table for displaying build information to a user, i.e., a management user at the management station 18 (FIG. 1). Important functionality is included in the monitor process 14 as well as the individual builds 16-1, 16-2, all of which are executing concurrently for a given build cycle of operation. As shown, operation commences with a preparation step (BUILD PREP) 40. Each of the builds 16 includes a respective source checkout 42, build operation 44, and signal complete operation 46 which signals to the monitor process 14 that the respective build has been completed. This signaling may be realized using settable environment variables, for example. The monitor process 14 is a looping process that collects and displays build progress information at regular intervals such as every 5 minutes for example. Each iteration includes a step 48 of collecting current build progress information, a step 50 of updating the summary table with the current build information, and a testing step 52 for determining whether the current cycle is complete. In particular, at 52 the monitor process 14 determines whether it has received completion signals from all the concurrent builds, as generated at the respective steps 46-1, 46-2 in this example. If not, then at 54 the monitor process "sleeps" (i.e., is inactive) for a determined period (e.g., 5 minutes), after which it awakens and executes another loop. If so, then the present cycle is done and a final post-processing step (BUILD POST) 56 is executed.

The tables below illustrate operation, specifically in relation to progression of the builds 16 and updating of the summary table by monitor process 14. The summary table is a display object, displayed in a graphical user interface (GUI) screen of a management application executed on the management station 18 (FIG. 1). Thus each table below represents a corresponding snapshot of the summary table display at different points during operation, which in this example are (1) shortly after the process has begun, when a few of the components have been successfully incorporated into each build and the builds 16 are continuing, and (2) at the conclusion of operation, when both the builds 16 have completed.

The tables includes rows for the respective components of the application, and respective columns for the distinct builds (in this example, Build 1 (16-1) and Build 2 (16-2). In this depiction the components are identified in a schematic fashion as Comp-1, Comp-2 etc., whereas in a real display these would be identified by real component names as may be assigned by the respective developers for example. Thus a component providing storage replication services, for example, might have a name such as "Replication". The Hash values Hx are hashes or digests of the respective component sources that have been committed to the build. For each build, the following information is included: Status, Time, C-Key and Artifact. The Status indicates whether the component has been processed for the current build yet, and if so its completion status. Time can be used to measure elapsed time during processing of the respective component, and as such may start at zero and count up until the component processing is complete. C-Key is a Cache Key used in connection with caching for reuse of unchanged components. Artifact is a link to related data object, most notably the final built application image upon completion. Both the Hash values and Cache Keys are hyperlinks to other pages of information specific to these versions of the components.

Table 1 below shows the summary table display at a time shortly after the process has begun. For Build 1 (e.g., Retail), components 2 and 3 have already been processed with a status of OK (no errors encountered), and the "Run'g" status for component 1 indicates that it is still being processed. The NS status for all other components indicates that their processing has not yet started. Build 2 has a similar overall status, with component 2 completed and components 1 and 3 still being processed. In general it would be expected that the builds would have similar levels of completion at any given instance, subject to variability for various reasons including differences in component complexity, whether errors are encountered, differences in resource availability (e.g., underlying processing hardware), etc.

A key benefit of the summary table display as illustrated in Table 1 is the separation of different builds into respective columns, enabling a user to easily see status for the individual builds 16-1, 16-2 notwithstanding that they are being executed in parallel. As noted above, in prior systems that utilized the console outputs of concurrently executed build processes, the interleaved display of build progress information made it difficult for a user to readily discern and evaluate individual build progress and status.

TABLE 1

(summary table display early in process)

| Component Name; Hash | Build 1 | | | Build 2 | | |
|---|---|---|---|---|---|---|
| | Status Time | C-Key Artifact | | Status Time | C-Key Artifact | |
| Comp-1 H1 | Run'g | K1-1 | | Run'g | K2-1 | |
| Comp-2 H2 | OK | K1-2 | | OK | K2-2 | |
| Comp-3 H3 | OK | K1-3 | | Run'g | K2-3 | |
| Comp-4 H4 | NS | | | NS | | |
| ... | ... | | | ... | | |
| Comp-n Hn | NS | | | NS | | |

Table 2 below shows the summary table display at a later time when both builds have completed. This simplified example assumes that both builds complete with no errors or other issues that might merit investigation by the management user. More generally, for either or both builds 16 there may be one or more components having other than an OK status, indicating that some review and/or corrective action may be required. Another scenario not well depicted here is that one of the builds may complete within an expected time (e.g., 1-2 hours) and another one becomes "hung" and does not complete within a similar time, as indicated by a persistent "Run'g" status for one or more components of the affected build. A management user will easily be able to observe such operation using the summary table display, so as to be able to identify such a situation and take action accordingly (such as terminating and re-starting the affected build, etc.).

Additionally, this example assumes that every component is being built as part of the overall builds 16-1, 16-2. More generally, in many circumstances some number of the components have not changed and do not require rebuilding, and thus can be obtained from cache rather than being rebuilt. For such components, the cached status may be reflected in the Status column, e.g., using a status of Cached for example. This informs the user than the component is being obtained from cache and thus has no associated current build activity. In one embodiment the cache is implemented using a tool called Artifactory. The technique of using cached components when possible is referred to as "build avoidance".

TABLE 2

(summary table display at completion)

| Component Name; Hash | Build 1 | | Build 2 | |
|---|---|---|---|---|
| | Status Time | C-Key Artifact | Status Time | C-Key Artifact |
| Comp-1 H1 | OK | K1-1 | OK | K2-1 |
| Comp-2 H2 | OK | K1-2 | OK | K2-2 |
| Comp-3 H3 | OK | K1-3 | OK | K2-3 |
| Comp-4 H4 | OK | K1-4 | OK | K2-4 |
| ... | ... | | ... | |
| Comp-n Hn | OK | K1-n | OK | K2-m |

Figure 4:
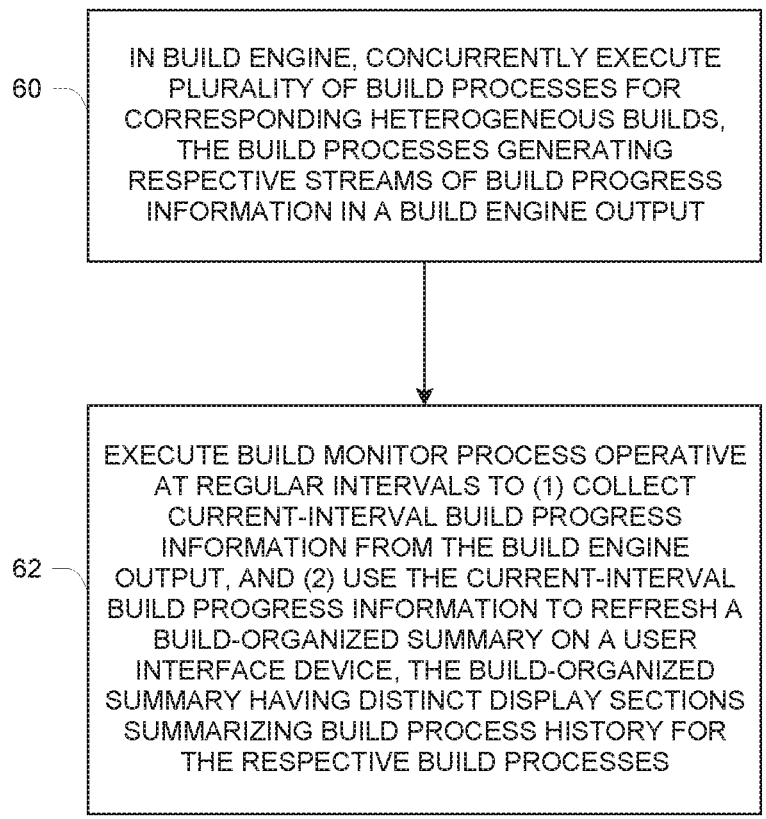
FIG. 4 is a flow diagram of operation of the build system.

FIG. 4 is a high-level flow diagram of operation of a build system such as the build system 12. At 60, in a build engine, a plurality of build processes for corresponding heterogeneous builds are concurrently executed. The build processes generate respective streams of build progress information in a build engine output. In one embodiment, the build engine output may be a merged console output, i.e., the streams of console output of the separate build processes, multiplexed together into a single merged stream in which each output record includes an identifier of the build process that generated it. At 62, a build monitor process is executed that is configured and operative at regular intervals to (1) collect current-interval build progress information from the build engine output, and (2) use the current-interval build progress information to refresh a build-organized summary on a user interface device, the build-organized summary having distinct display sections summarizing build process history for the respective build processes. As described above, in one embodiment such a build-organized summary can take the form of a table-organized display, with separate columns for the builds and the rows conveying various information for respective components of the builds.

CONCLUSION

The disclosed technique addresses the problem that it is difficult to see overall progress of individual builds within a multi-tenanted build system. It can be applied to data storage system products for example, but also it can apply to more generally to software industry product builds which take a long time and are composed of multiple small components builds. The technique dynamically shows build progress and information in a summary table, with continual monitoring of build console output and refreshing the summary table. Getting benefits from dynamic summary table, a management user can timely know the build status and be navigated in the summary table for viewing build information or troubleshooting.

While various embodiments of the invention have been particularly shown and described, it will be understood by those skilled in the art that various changes in form and details may be made therein without departing from the scope of the invention as defined by the appended claims.

What is claimed is:

1. A method of operating a build system wherein the build system including one or more computerized devices and respective interfaces to a management station, a repository, development systems, and production systems, wherein (i) the management station orchestrates operation of the build system under control of a human management user and includes a user interface, (ii) the repository stores created builds of an application along with versions of source components of the application provided by the development systems as used by developers and/or application maintenance personnel, (iii) the production systems are configured and operative to deploy new builds from the repository to end-users of the application, the method comprising:

in a build engine, concurrently executing a plurality of build processes for corresponding heterogeneous builds of the application, the build processes generating respective streams of build progress information in a build engine output; and executing a build monitor process configured and operative at regular intervals to (1) collect current-interval build progress information from the build engine output, and (2) use the current-interval build progress information to refresh a build-organized summary on a user interface device, the build-organized summary having distinct display sections summarizing build process history for respective build processes, wherein each of the build processes includes a respective source checkout operation, a subsequent build operation using checked-out sources, and completion signaling operation which signals to the build monitor process that the respective build processes have been completed;

wherein the build monitor process is a looping process that collects and displays the current-interval build progress information at the regular intervals, each regular interval including a testing step for determining whether the current interval is complete by determining whether it has received completion signals from all the build processes as generated in their respective completion signaling operations; and wherein each of the regular intervals includes collecting the current-interval build progress information, updating the build-organized summary with the current-interval build process information, and the testing step, and wherein, when not all completion signals have been received in the testing step, then the build monitor process sleeps for a determined period after which it awakens and executes another loop.

2. The method of claim 1, wherein the build system is a multi-tenanted build system in which each of the builds includes a respective set of component builds for constituent components of the application, and wherein the streams of build progress information include per-component progress information generated by respective ones of the component builds as they are executed.

3. The method of claim 2, wherein each stream of build progress information includes a series of lines or records of progress information is tagged with a name of a corresponding constituent component that the line or record relates to, the name being used to process the line or record information into the build-organized summary.

4. The method of claim 2, wherein one or more of the components are cached components that do not require rebuilding for a current build and are obtained from a cache of previous component builds, and the build-organized summary includes a cached indicator for the cached components indicating that the components are being obtained from cache and have no associated current build activity.

5. The method of claim 2, wherein the constituent components are the source components of the application including one or more of routines, functions, sub-programs, and library elements, provided by development systems as used by developers and/or application maintenance personnel.

6. The method of claim 1, wherein the heterogeneous builds include (1) a retail build being a regular version for release to customers, and (2) a debug build being a specialized build for use by developers in debugging and refining application code.

7. The method of claim 1, wherein the build-organized summary is a summary table having respective columns in which the build progress information for the respective build processes is displayed.

8. The method of claim 7, wherein:

the build system is a multi-tenanted build system in which each of the builds includes a respective set of component builds for constituent components of the application, and the streams of build progress information include per-component progress information generated by respective ones of the component builds as they are executed; and the summary table includes rows for the respective constituent components of the application.

9. The method of claim 8, wherein each of the rows includes, for the respective constituent component (1) a component name, (2) a digest of respective component sources that have been committed to the build, and (3), for each of the builds, (i) a status indicating whether the component has been processed for the current build, and if so its completion status, (ii) a time value identifying elapsed time during processing of the component, (iii) a cache key referring to a cached version of the component when the component is not being rebuilt for the current build, and (iv) an artifact link to related data of the component.

10. The method of claim 9, wherein digests and cache keys are hyperlinks to other pages of information specific to the versions of the components included in the current build.

11. A system of one or more computerized devices configured and operative as a build system, including respective interfaces to a management station, a repository, development systems, and production systems, wherein (i) the management station orchestrates operation of the build system under control of a human management user and includes a user interface, (ii) the repository stores created builds of an application along with versions of source components of the application provided by the development systems as used by developers and/or application maintenance personnel, (iii) the production systems are configured and operative to deploy new builds from the repository to end-users of the application, the build system including processing circuitry and memory storing computer program instructions executed by the processing circuitry to cause the build system to perform operations including:

in a build engine, concurrently executing a plurality of build processes for corresponding heterogeneous builds of the application, the build processes generating respective streams of build progress information in a build engine output;

executing a build monitor process configured and operative at regular intervals to (1) collect current-interval build progress information from the build engine output, and (2) use the current-interval build progress information to refresh a build-organized summary on a user interface device, the build-organized summary having distinct display sections summarizing build process history for respective build processes, wherein each of the build processes includes a respective source checkout operation, a subsequent build operation using checked-out sources, and completion signaling operation which signals to the build monitor process that the respective build processes have been completed;

wherein the build monitor process is a looping process that collects and displays the current-interval build progress information at regular intervals, each regular interval including a testing step for determining whether the current interval is complete by determining whether it has received completion signals from all the build processes as generated in their respective completion signaling operations; and wherein each of the regular intervals includes collecting the current-interval build progress information, updating the build-organized summary with the current-interval build process information, and the testing step, and wherein, when not all completion signals have been received in the testing step, then the build monitor process sleeps for a determined period after which it awakens and executes another loop.

12. The system of claim 11, wherein the build system is a multi-tenanted build system in which each of the builds includes a respective set of component builds for constituent components of the application, and wherein the streams of build progress information include per-component progress information generated by respective ones of the component builds as they are executed.

13. The system of claim 12, wherein each stream of build progress information includes a series of lines or records of progress information is tagged with a name of a corresponding constituent component that the line or record relates to, the name being used to process the line or record information into the build-organized summary.

14. The system of claim 12, wherein one or more of the components are cached components that do not require rebuilding for a current build and are obtained from a cache of previous component builds, and the build-organized summary includes a cached indicator for the cached components indicating that the components are being obtained from cache and have no associated current build activity.

15. The system of claim 12, wherein the constituent components are the source components of the application including one or more of routines, functions, sub-programs, and library elements, provided by development systems as used by developers and/or application maintenance personnel.

16. The system of claim 11, wherein the heterogeneous builds include (1) a retail build being a regular version for release to customers, and (2) a debug build being a specialized build for use by developers in debugging and refining application code.

17. The system of claim 11, wherein the build-organized summary is a summary table having respective columns in which the build progress information for the respective build processes is displayed.

18. The system of claim 17, wherein:
    the build system is a multi-tenanted build system in which each of the builds includes a respective set of component builds for constituent components of the application, and the streams of build progress information include per-component progress information generated by respective ones of the component builds as they are executed; and the summary table includes rows for the respective constituent components of the application.

19. The system of claim 18, wherein each of the rows includes, for the respective constituent component (1) a component name, (2) a digest of respective component sources that have been committed to the build, and (3), for each of the builds, (i) a status indicating whether the component has been processed for the current build, and if so its completion status, (ii) a time value identifying elapsed time during processing of the component, (iii) a cache key referring to a cached version of the component when the component is not being rebuilt for the current build, and (iv) an artifact link to related data of the component.

20. The system of claim 19, wherein digests and cache keys are hyperlinks to other pages of information specific to the versions of the components included in the current build.

\* \* \* \* \*